United States Patent [19]

Sadler, Jr. et al.

[11] Patent Number: 4,921,261
[45] Date of Patent: May 1, 1990

[54] INFANT CONVERSION STROLLER

[76] Inventors: Edward L. Sadler, Jr.; Edward L. Sadler, Sr., both of 2804 Plantition Rd., Harrisburg, N.C. 28075

[21] Appl. No.: 295,140
[22] Filed: Jan. 9, 1989
[51] Int. Cl.⁵ .............................................. B62B 7/06
[52] U.S. Cl. ..................................... 280/30; 280/643; 280/648; 280/655.1; 297/134; 403/386
[58] Field of Search ...................... 280/30, 31, 47.315, 280/47.371, 642, 643, 648, 655.1, 647, 650, 657, 658, 47.38; 297/134, 250; 403/384, 386

[56] References Cited

U.S. PATENT DOCUMENTS

| | | | |
|---|---|---|---|
| 2,482,827 | 9/1949 | Black | 280/30 |
| 2,645,502 | 7/1953 | Collins et al. | 280/31 |
| 2,722,966 | 11/1955 | Belyeu | 280/30 |
| 3,829,113 | 8/1974 | Epelbaum | 280/30 |
| 3,997,180 | 12/1976 | Okubo | 280/31 |
| 4,564,212 | 1/1986 | Orlandino et al. | 280/642 |

FOREIGN PATENT DOCUMENTS

| | | | |
|---|---|---|---|
| 411403 | 6/1934 | United Kingdom | 403/386 |
| 2145671 | 4/1985 | United Kingdom | 280/31 |

Primary Examiner—Charles A. Marmor
Assistant Examiner—Brian Johnson
Attorney, Agent, or Firm—Leon Gilden

[57] ABSTRACT

An infant conversion stroller is set forth wherein the same includes a portable wheeled stroller extensively arranged, including an overlying sun canopy, pivotally mounted relative to an extensible rear framework portion that is itself extensible and retractable relative to an associated lower framework having secured thereto a plurality of wheels for mobility of the apparatus. The infant container and associated infant framework is removably secured to the lower framework by a plurality of friction pins.

3 Claims, 1 Drawing Sheet

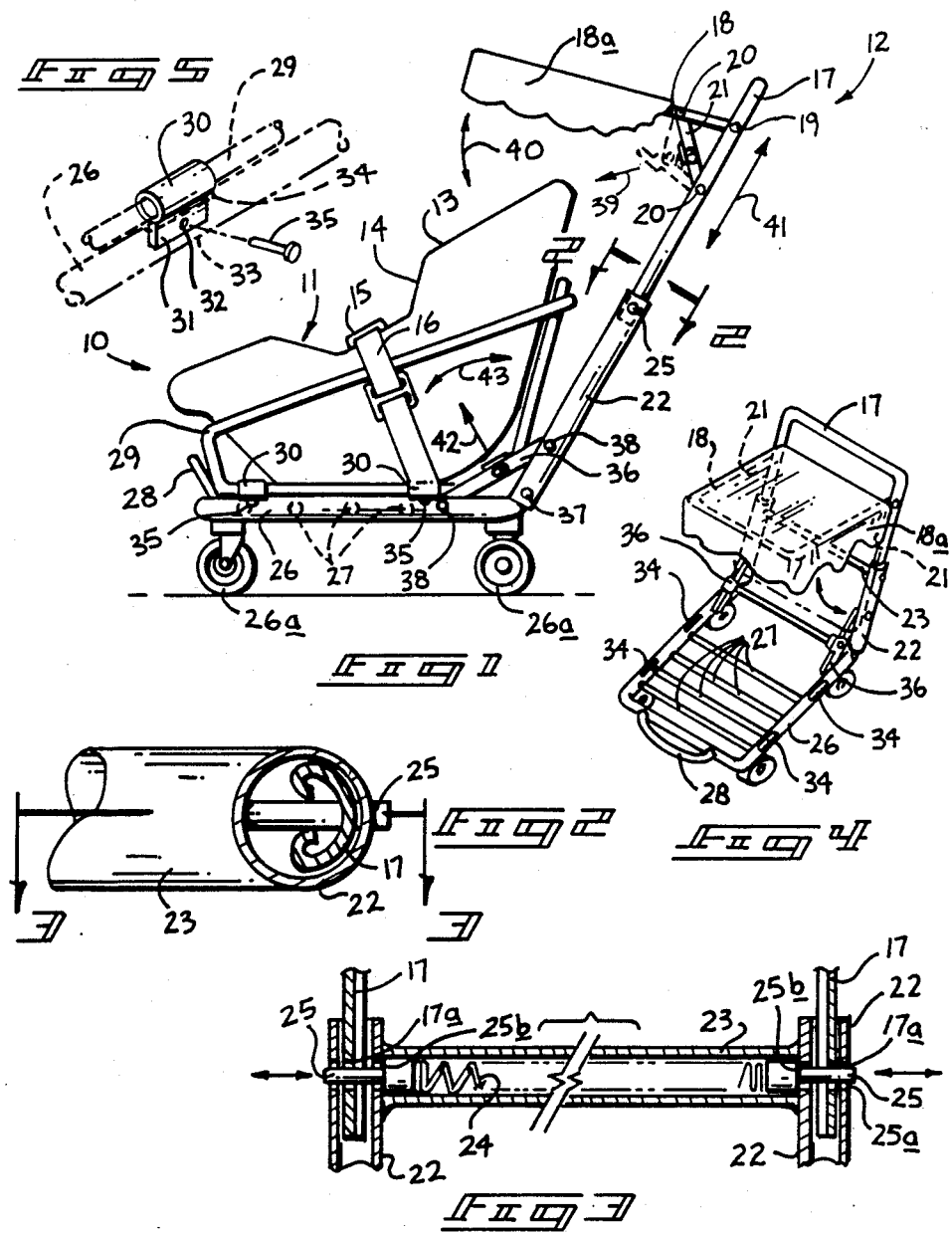

INFANT CONVERSION STROLLER

BACKGROUND OF THE INVENTION

1. Field of the Invention

The field of invention relates to child's safety securement apparatus, and more particularly pertains to a new and improved infant conversion stroller wherein the same may be folded into a compact orientation for storage upon removal of an infant carrier therefrom.

2. Description of the Prior Art

The use of infant strollers and the like is well known in the prior art. As may be appreciated, these devices have typically required a substantial amount of space to store the apparatus during periods of non-use. Furthermore, apparatus for providing conversion from a stroller to a car seat has been presented by the prior art, but has heretofore failed to provide the compact organization of the instant invention. For example, U.S. Pat. No. 4,570,956 to Dyer sets forth a conventional car seat securably mounted within a framework, but fails to provide the interfolded organization of the instant invention of the framework during periods of non-use to enable compact storage thereof.

U.S. Pat. No. 4,657,269 to Elvin sets forth a tandem infant carrier apparatus utilizing a wheeled stroller unit and an articulated framework rearwardly mounted to the stroller unit for securing an infant therein.

U.S. Pat. No. 3,207,528 to Hasche sets forth a child seat and carriage wherein the child support includes a plurality of wheels with a rearwardly and angularly mounted framework for securement of the child's seat to a vertical portion of a conventional car seat.

U.S. Pat. No. 3,550,998 to Boudreau, et al., sets forth a foldable carriage and infant seat combination wherein the securement of the infant seat to the framework is positioned along the diagonally oriented rails of the Boudreau framework, as opposed to the instant invention securing the infant seat to the lower perimeter framework for enhanced rigidity as well as relative ease of removal of the instant invention infant seat as opposed to the relative complexity of the Boudreau patent.

U.S. Pat. No. 4,065,177 to Hyde sets forth an infant seat carrier including an infant carrier mounted to the frame by brackets and pins to enable the seat to be removed from the carrier frame, but is of a relatively complex organization as opposed to the instant invention utilizing a series of friction pins to enable immediate removal of the infant seat relative to a lowermost framework of the carrier frame assembly.

As such, it may be appreciated that there is a continuing need for a new and improved infant conversion stroller which addresses both the problems of storage, portability, and ease of use, and in this respect the present invention substantially fulfills this need.

SUMMARY OF THE INVENTION

In view of the foregoing disadvantages inherent in the known types of infant conversion strollers now present in the prior art, the present invention provides an infant conversion stroller apparatus wherein the same may be compactly stored when not in use and may be further easily and effectively extended for securement of an infant seat that is itself removable in use within an automobile environment. As such, the general purpose of the present invention, which will be described subsequently in greater detail, is to provide a new and improved infant conversion stroller which has all the advantages of the prior art infant safety securement devices and none of the disadvantages.

To attain this, the present invention comprises an extensible framework including a pivotally mounted sun canopy retractable to a nest position adjacent a retractable handle retractable within an intermediate framework portion. The intermediate framework portion is pivotally mounted and foldable against a bottom framework portion wherein the same releasably mounts an infant seat framework utilizing a series of flanges receivable within the bottom framework.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved infant conversion stroller apparatus which has all the advantages of the prior art infant conversion stroller apparatus and none of the disadvantages.

It is another object of the present invention to provide a new and improved infant conversion stroller apparatus which may be easily and efficiently manufactured and marketed.

It is a further object of the present invention to provide a new and improved infant conversion stroller apparatus which is of a durable and reliable construction.

An even further object of the present invention is to provide a new and improved infant conversion stroller apparatus which is susceptible of a low cost of manufacture with regard to both materials and labor, and which accordingly is then susceptible of low prices of sale to the consuming public, thereby making such infant conversion stroller apparatus economically available to the buying public.

Still yet another object of the present invention is to provide a new and improved infant conversion stroller apparatus which provides in the apparatuses and methods of the prior art some of the advantages thereof, while simultaneously overcoming some of the disadvantages normally associated therewith.

Still another object of the present invention is to provide a new and improved infant conversion stroller apparatus wherein the same releasably secures an infant seat and associated framework therefrom wherein the stroller apparatus is interfoldable into a compact storage unit during periods of nonuse.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view taken in elevation of the instant invention.

FIG. 2 is an orthographic view taken along the lines 2—2 of FIG. 1 in the direction indicated by the arrows.

FIG. 3 is an orthographic cross-sectional view taken along lines 3—3 of FIG. 2 of the release mechanism accepting the outer framework within the intermediate framework.

FIG. 4 is an isometric illustration of the infant seat stroller framework.

FIG. 5 is an isometric illustration, somewhat enlarged, of the coupling arrangement of the infant seat framework to the stroller framework.

DESCRIPTION OF THE PREFERRED EMBODIMENT

With reference now to the drawings, and in particular to FIGS. 1 to 5 thereof, a new and improved infant conversion stroller apparatus embodying the principles and concepts of the present invention and generally designated by the reference numeral 10 will be described.

More specifically, it will be noted that the infant conversion stroller apparatus 10 essentially comprises an infant seat 11 secured to a collapsible frame assembly 12. The infant seat 11 comprises a concave seat 13 of unitary construction formed with a plurality of recesses 14 each provided with a guide loop 15 for guidingly positioning a safety belt 16. The safety belt 16 depends downwardly and is secured at each end to rear opposed yokes 30, as illustrated in FIG. 1.

The outer "U" shaped handle 17 of the apparatus includes a plurality of downwardly depending parallel spaced legs telescopingly receivable within the intermediate framework 22 comprising a plurality of parallel spaced legs of a diameter greater than that of the downwardly depending legs of the handle 17 to receive the handles, as illustrated in FIG. 2 for example. The outer "U" shaped handle 17 further includes a sun shade framework 18 with a flexible opaque sun shade 18a secured thereon for providing shade to the underlying infant seat 11 and is secured to the handle 17 by first spaced pivots 19 for each extending leg of the sun shade framework 18 mounted to the handle 17. A pair of spaced first collapsing latches 21 comprising a plurality of interengaging and lockable links pivotally mounted to the handle 17 at one end and to the sun shade 18 at the other end enable collapse of the sun shade and the framework against the handle 17 and the intermediate framework 22.

A cross frame 23 is spaced proximate the upper terminal ends of each leg of the intermediate framework 22 and houses a captured spring 24 coextensively therewithin with release bosses 25 extending outwardly of the cross brace 23 through first and third through-extending apertures 25a and 25b respectively formed through the intermediate framework legs 22, as illustrated in FIG. 3 for example clearly inward projection of each release base 25 beyond respective apertures 25a and 25b allows collapsing of handle 17. Each downwardly depending leg includes a second through-extending aperture 17a whereupon depression inwardly against the force of the included spring 24 enables the respective legs of the handle 17 to collapse within the respective legs of the intermediate framework 22. The intermediate framework 22 legs are pivotally secured to a bottom framework 26. The bottom framework 26 includes a plurality of parallel support slats 27 and a forward abutment frame 28 for securement of the infant seat 11 to the bottom framework 26. The infant seat 11 is integrally secured to a rigid encompassing seat frame 29 formed with a lower link provided with a plurality of yokes 30 on each side of the infant seat 11 wherein each yoke 30 is formed with a downwardly depending flange 31 with a flange aperture 32 therethrough. The bottom framework 26 is provided with aligned bottom frame apertures 33 aligned with the flange apertures 32 upon positioning of the respective flanges 31 within receiving slots 34 formed through upper surfaces of the bottom framework 26, as illustrated in FIG. 4 for example. A friction locking peg 35 extends through the bottom frame aperture 33 and into the associated flange aperture 32 to secure the infant seat and associated framework to the bottom framework 26 and accordingly enables quick removal of the infant seat and associated framework when collapse of the framework assembly 12 is desired. Second collapsing latches 36 are provided with second latch pivots 38 pivoted to the respective intermediate framework leg 22 and bottom framework 26 wherein the respective intermediate and bottom framework portions 22 and 26 respectively are pivotally mounted together at third pivot junctions 37.

Upon release of the first collapsing latches 21 in the direction of the first arrow 39, the sun shade 18 is pivoted downwardly in the direction of the second arrow 40 against the intermediate framework members 22 upon depressing of the release bosses 25 inwardly and telescoping of the legs of the "U" shaped handle 17 downwardly in the direction of the third arrow 41. Upon release of the second latches 36, in the direction of the fourth arrow, the intermediate framework 22 may then be collapsed against the bottom framework 26 in the direction of arrow 43 upon removal of the infant seat 11 and associated framework therefrom. In this manner, a compact organization is conveniently presented whereupon the infant seat 11 may be utilized independently in an automotive environment as desired with the associated framework providing the necessary stability for securement to an automotive seat. The assembly is conversely easily directed when desired for use of the instant invention in a stroller mode.

The manner of usage and operation therefore of the instant invention should be apparent from the above description, and accordingly no further discussion relative to the manner of usage and operation of the instant invention shall be provided.

With respect to the above description then, it is to be realized that the optimum dimensional relationships for the parts of the invention, to include variations in size, materials shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An infant conversion stroller apparatus comprising, an infant seat of unitary construction integrally secured to a surrounding seat framework, said seat framework including lower rails with a plurality of mounting yokes secured surroundingly thereto,
and
a frame assembly including a handle telescopingly mounted within an intermediate framework, and said intermediate framework pivotally mounted to a bottom framework,
and
said bottom framework including receiving slots for receiving each of said mounting yokes,
and
further including locking pegs to secure each yoke to said bottom framework when received within each receiving slot,
and
wherein each mounting yoke further includes a downwardly depending flange with a through-extending flange aperture formed through said flange, and at least one bottom frame aperture formed through said bottom framework proximate each receiving slot wherein said bottom frame aperture and said flange aperture is positioned to receive a locking peg when said flange is positioned within said receiving slot,
and
wherein said receiving slots comprise a plurality of slots wherein each slot is dimensioned to receivingly accept each downwardly depending flange,
and
wherein said bottom framework is pivotally mounted to said intermediate framework proximate terminal end portions of said bottom and intermediate frameworks, and further including a pivotally mounted collapsing latch wherein said collapsing latch is pivotally mounted at distal ends thereof to respective bottom and intermediate framework portions spaced from the terminal ends of said bottom and intermediate framework wherein said latch comprises a plurality of locking links,
and
wherein said handle comprises a plurality of downwardly depending legs slidably receivable within said intermediate framework, and said intermediate framework further includes a cross member integrally secured between spaced parallel portions of said intermediate framework and further including an elongate spring therewithin biasing outwardly from each end of said cross member a locking boss slidingly positionable within aligned apertures of respective portions of said intermediate framework, and further including a handle aperture formed through each downwardly depending leg of said handle and aligned with said through-extending apertures in a first position when said handle is extended outwardly from said intermediate framework, and misaligned with said through-extending apertures when telescopingly received within said intermediate framework,
and
wherein said bottom framework further includes a plurality of spaced slots for receiving and supporting said infant seat,
and
wherein said infant seat comprises a plurality of recesses spaced downwardly from an upper terminal edge of said infant seat and including guide loops formed within said recesses for receiving and maintaining a safety belt therethrough wherein said safety belt is secured to opposed yokes of said seat framework.

2. An infant conversion stroller apparatus as set forth in claim 1 wherein said apparatus further includes a sun shade pivotally mounted to said handle and including a further plurality of collapsing latches mounted between said sun shade and said handle to lock said sun shade in a first position extending outwardly from said handle and collapsing to a second position adjacent said handle and said intermediate framework upon removal of the infant seat.

3. An infant conversion stroller apparatus as set forth in claim 2 further including a forward abutment frame mounted to a forward portion of said bottom framework for providing an abutment preventing repositioning of said infant seat when secured to said bottom framework.

* * * * *